United States Patent [19]
Sudo et al.

[11] Patent Number: 5,513,089
[45] Date of Patent: Apr. 30, 1996

[54] SWITCHING POWER SOURCE CONTROL CIRCUIT FOR CONTROLLING A VARIABLE OUTPUT TO BE A TARGET VALUE BY THINNING-OUT SWITCHING PULSES

[75] Inventors: Sukehisa Sudo, Yokohama; Hitokatsu Hashimoto, Tokyo; Junichi Sasaki, Sendai; Tsuneo Ikenoue, 14-6, Ichiban-cho 1-chome, Aoba-ku, Sendai-shi, Miyagi 980, all of Japan

[73] Assignees: Hiyoshi Electric Works Co., Ltd., Kanagawa; Micron Instrument Inc., Tokyo; Tohoku Ricoh Co., Ltd., Miyagi; Tsuneo Ikenoue, Miyagi, all of Japan

[21] Appl. No.: 261,893

[22] Filed: Jun. 15, 1994

[30] Foreign Application Priority Data

Jun. 18, 1993  [JP]  Japan .................. 5-147756

[51] Int. Cl.⁶ .................. H02M 3/335; G05F 1/40
[52] U.S. Cl. .................. 363/21; 323/282
[58] Field of Search .................. 363/16, 20, 21, 363/74, 80, 97, 131; 323/235, 236, 266, 271, 282, 285

[56] References Cited

U.S. PATENT DOCUMENTS

| | | | |
|---|---|---|---|
| 4,344,121 | 8/1982 | Weber | 363/16 |
| 4,513,360 | 4/1985 | Ikenoue et al. | 363/20 |
| 4,524,413 | 6/1985 | Ikenoue et al. | 363/127 |
| 5,278,490 | 1/1994 | Smedley | 323/282 |
| 5,349,514 | 9/1994 | Ushiki et al. | 363/21 |
| 5,398,181 | 3/1995 | Yek | 363/21 |
| 5,408,402 | 4/1995 | Nonnenmacher | 363/21 |

*Primary Examiner*—Peter S. Wong
*Assistant Examiner*—Matthew V. Nguyen
*Attorney, Agent, or Firm*—Evenson, McKeown, Edwards & Lenahan

[57] ABSTRACT

A switching power source control circuit comprising a comparator, a thin-out-processed pulse generator, a thinned-pulse detector, and a reset speed regulator, wherein: the comparator compares an output signal of an error amplifier with a variable reference voltage generated by the reference voltage regulator to generate a signal for performing thin-out operation in accordance with a voltage difference between the output signal of the error amplifier and the reference voltage; the thin-out-processed pulse generator generates thin-out-processed pulses on the basis of the output signal of the comparator; the thinned-out pulse detector detects the generation of thinned-out pulses or driving pulses while always monitoring the thin-out-processed pulses generated from the thin-out-processed pulse generator, and changes the reference voltage of the reference voltage regulator in the case where the thin-out rate is in a range of from 0 to ½ in the direction to make it difficult to perform thin-out operation to thereby prevent continuation of thin-out operation whenever one thinned-out pulse is detected; and the reset speed regulator resets the reference voltage of the reference voltage regulator to an initial value in accordance with the output signal of the error amplifier.

12 Claims, 15 Drawing Sheets

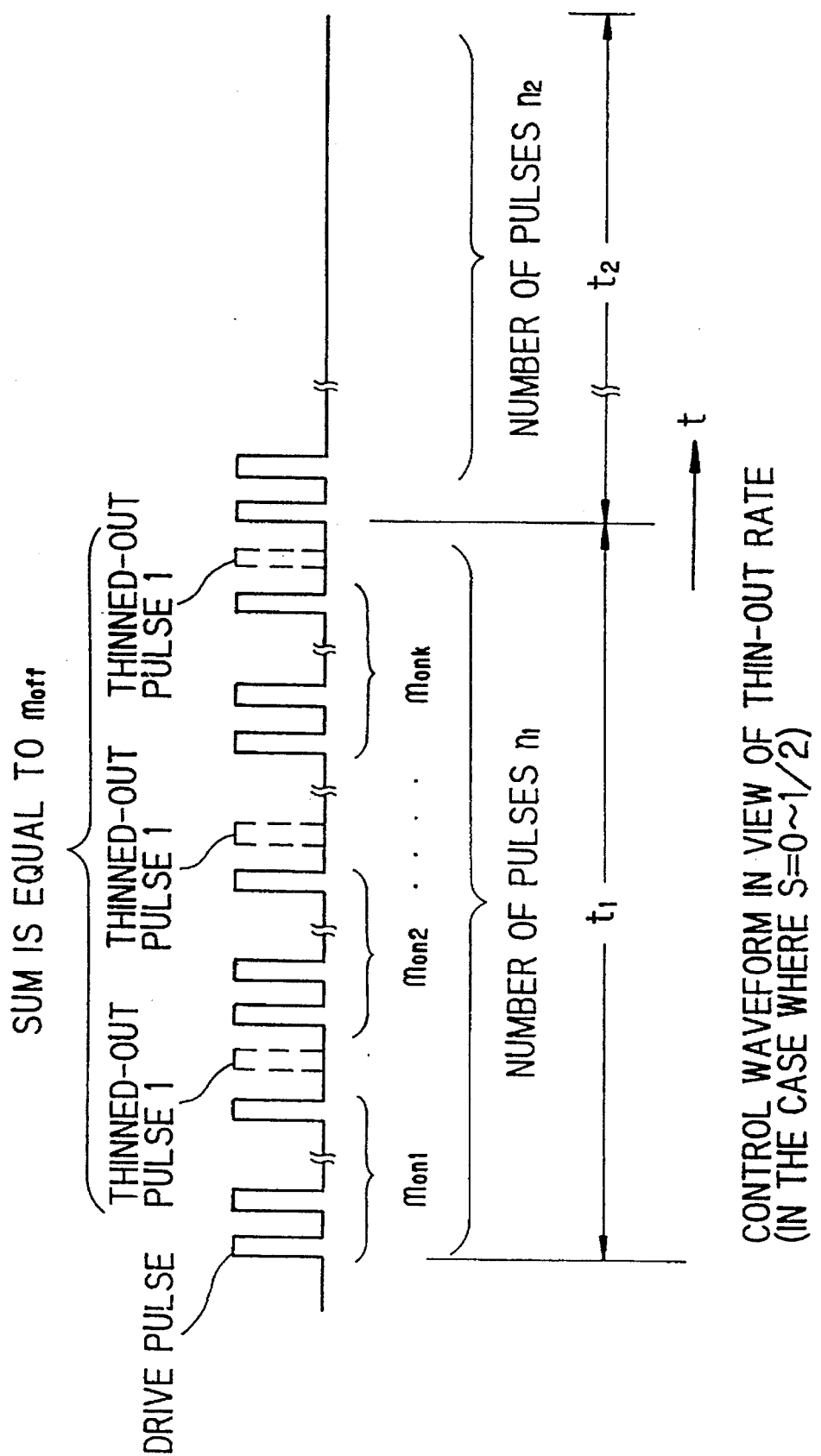

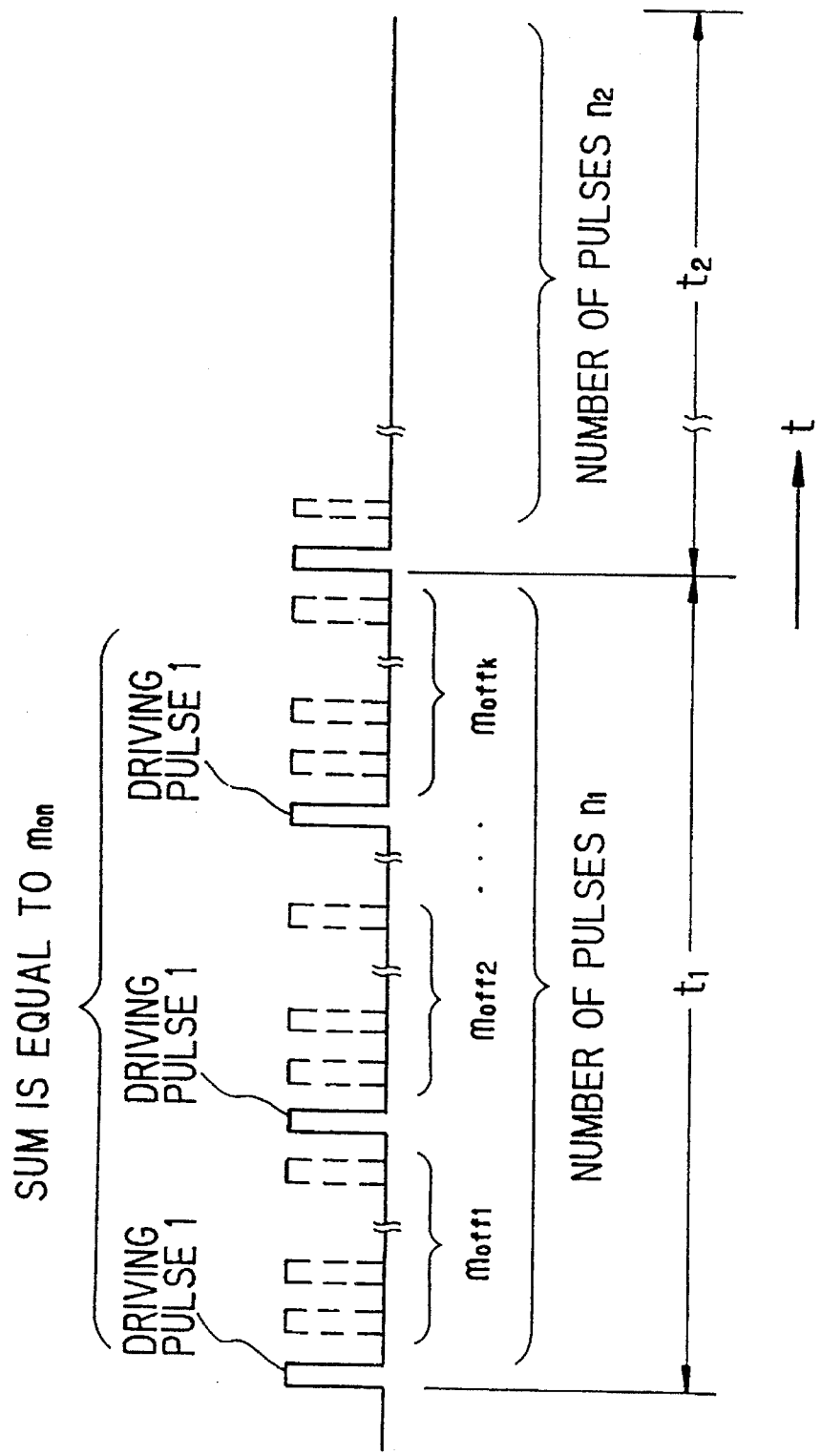

IN THE CASE OF NO THIN-OUT

CONTROL WAVEFORM BY CONVENTIONL METHOD $$S = \frac{1+1+1}{3+3+4}$$

CONTROL WAVEFORM ACCORDING TO THE PRESENT INVENTION (THIN-OFF RATE=0~1/2)

$$K = \frac{1+1+1}{3+3+4}$$

CONTROL WAVEFORM IN THE CASE OF THIN-OUT RATE OF 1/2~1

EXAMPLE OF OPERATION WAVEFORM OF SWITCHING ELEMENT

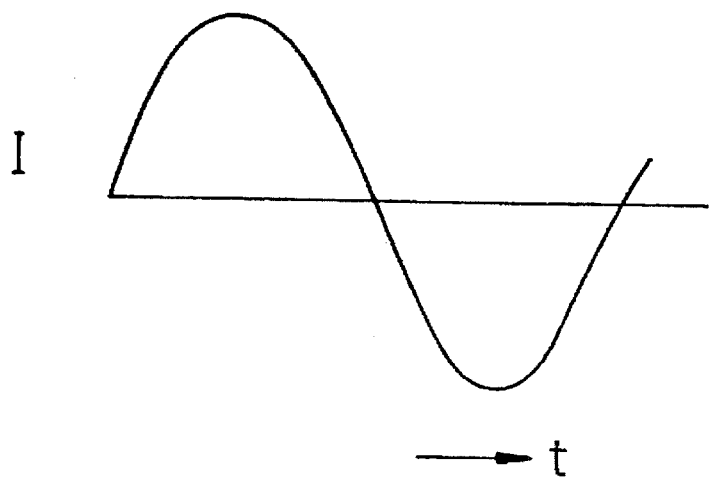
IN THE CASE OF ABSENCE
OF SATURABLE INDUCTOR  FIG. 12A
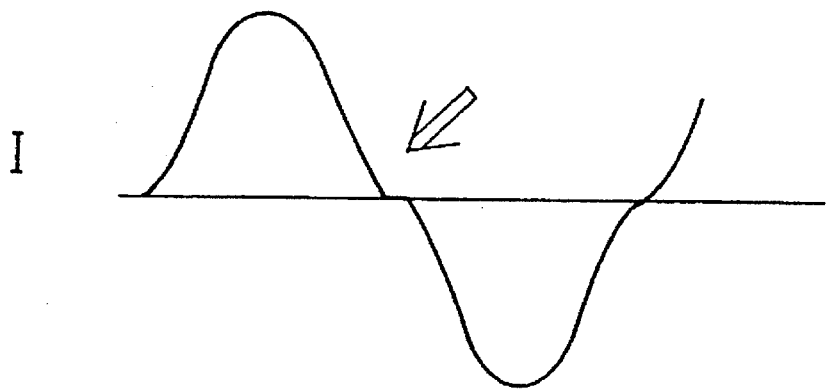
IN THE CASE OF PRESENCE
OF SATURABLE INDUCTOR
FIG. 12B

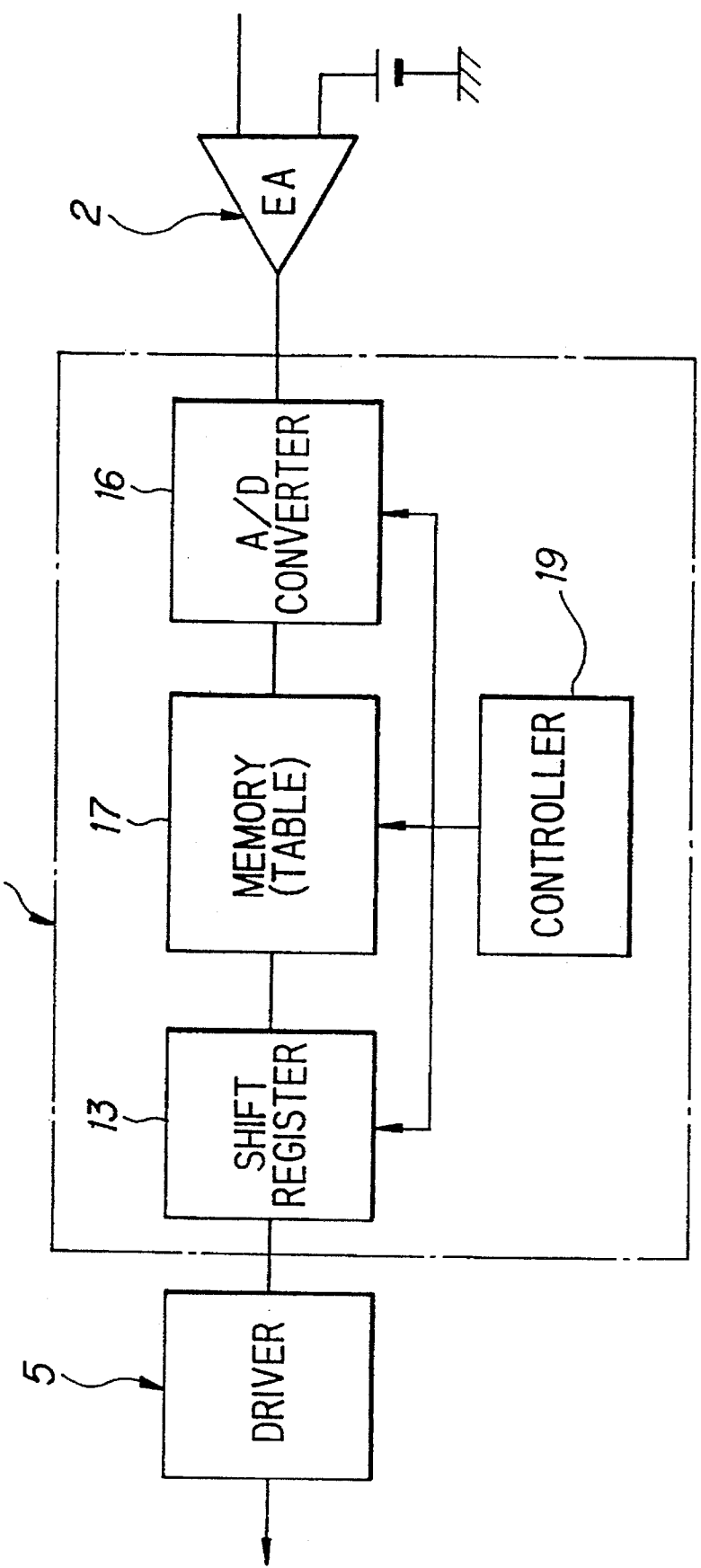

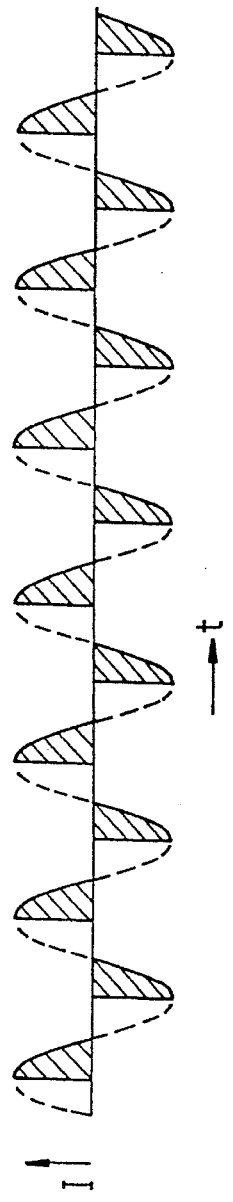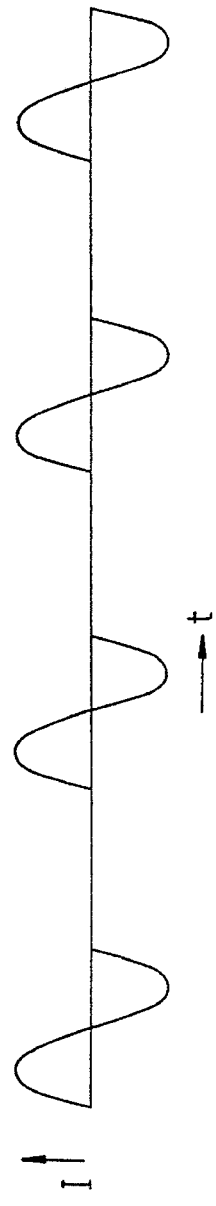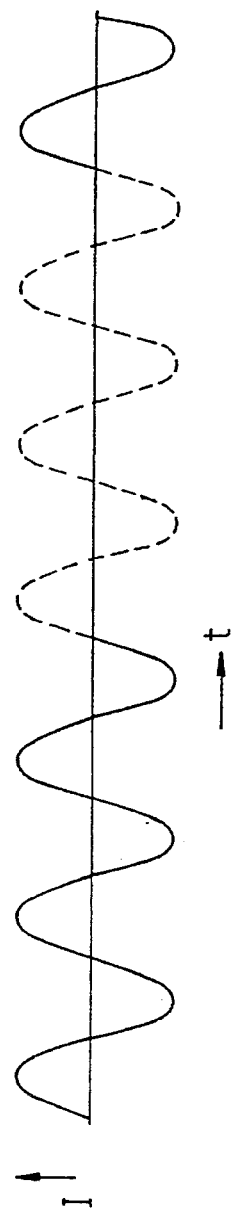
FIG. 15A  WAVEFORM OF PHASE CONTROL
FIG. 15B  WAVEFORM OF IDEAL THIN-OUT CONTROL
FIG. 15C  CONVENTIONAL WAVEFORM WHEN ON-OFF CONTINUES

SWITCHING POWER SOURCE CONTROL CIRCUIT FOR CONTROLLING A VARIABLE OUTPUT TO BE A TARGET VALUE BY THINNING-OUT SWITCHING PULSES

BACKGROUND OF THE INVENTION

1. Field of the Invention

The present invention relates to a switching power source control circuit for controlling the output value of a switching power source to be a target value by thinning-out switching pulses.

2. Description of the Prior Art

As a conventional example of thin-out control, a so-called on-off control method for controlling AC power of a commercial power source frequency is known. As AC power control in a commercial frequency, phase control by means of a discharge tube, an SCR (silicon controlled rectifier or thyristor), a TRIAC (triode AC switch), and so on is mainly used.

Phase control has a sufficient control capability but produces remarkably large noise because a switching element is turned on in a phase other than a phase where a current (or voltage) is zero. In order to reduce such a disadvantage, therefore, in thin-out control, a switching element is turned on (or turned off) at a point of time of zero-crossing of the current of the switching element to thereby properly adjust the ratio of the number of turn-on cycles to the number of turn-off cycles to control electric power to be supplied to a load. As a load, in most cases, an electric room-heating device, a cooking device, an electric furnace or the like is used, and as the switching element, an SCR, a TRIAC or the like is used.

The diagrams (a), (b) and (c) of FIG. 15 show typical examples of waveforms in the case of phase control in AC power control, in the case of ideal thin-out control and in the case of conventional thin-out control by on-off control, respectively. Each of the examples shows the case where electric power is reduced to a half of its maximum. In the phase control shown in FIG. 15(a), turn-on is made in the vicinity of the maximum current value, and there arises a problem that intensive noise is produced to disturb other devices.

FIG. 15(b) shows an ideal waveform in the case where electric power is reduced to a half by repeating turning-on and turning-off on alternate cycles. Because it is generally difficult to realize such thin-out control, the method shown in FIG. 15(c) is used in most cases in the present state. Although FIG. 15(c) shows the case of three continuous on-cycles and three continuous off-cycles for simplification of the drawing, there may be a case where the number of continuous on- and off-cycles reaches the order of tens of cycles in practical use in accordance with the time constant of an electric furnace or a temperature measuring sensor.

In the method shown in FIG. 15(c), however, if the number of continuous on- and off-cycles increases, the response in power control becomes slow as a result to thereby lower the control accuracy compared with the ideal method shown in FIG. 15(b) even if the thin-out rate is fixed between the both methods. In order to improve the control accuracy, therefore, it is necessary to conduct not only proportional (P) control but also complex control such as proportional-plus-derivative (P,D) control in which derivative control is combined with proportional control or integral-plus-derivative (I,D) control in which integral control is combined with derivative control. In some case, it is required to conduct further complex control such as proportional-plus-integral-plus-derivative (P,I,D) control.

For example, in the case of control on an electric furnace, the increase of the number of continuous on- and off-cycles in a commercial frequency is caused by the size of the heat capacity of the electric furnace or the time lag of detection of temperature. Accordingly, the time lag in an error amplifier or the like may be neglected sufficiently as long as the error amplifier is carried out with the speed of an ordinary differential amplifier (operational amplifier).

In the case where conventional on-off control is applied to switching power source control, however, continuation of turn-on or turn-off of a switching element is caused by time lag of a smoothening circuit in an output stage and by time lag of an error amplifier. As a result, there arises a problem that output variation longer in period compared with a switching frequency becomes large or the control becomes unstable. In addition, though switching frequencies used in the recent switching power source are generally in a range of from 100 to 200 KHz, switching frequencies in a range of from 500 KHz to the order of MHz has been reported with the advance of use of higher frequency recently. In such a case, the aforementioned problem becomes serious.

SUMMARY OF THE INVENTION

It is therefore an object of the present invention to provide a switching power source control circuit in which continuation of thinning-out pulses can be prevented to attain stabilization of control in the case where pulses are thinned out to control the output value of a switching power source to a target value.

In order to achieve the above object, according to a first aspect of the present invention, the switching power source control circuit for controlling an output value of a switching power source to be a target value by thinning-out switching pulses, comprises a thin-out-processed pulse generation means for generating thin-out-processed pulses on the basis of a reference voltage, and a thin-out control means for performing control to change the reference voltage so as to make it difficult to perform next thin-out operation to thereby prevent continuous rest of switching pulses whenever thin-out operation is performed once by the thin-out-processed pulse generation means with a thin-out rate in a range of from 0 to ½. Preferably, the thin-out control means controls the thin-out rate by changing the speed of resetting of the change of the reference voltage in accordance with the output variation of the switching power source.

In such a configuration, control is carried out with the control range divided into two, that is, a thin-out rate range of from 0 to ½ which is relatively frequently used and another thin-out rate range of from ½ to 1 which is not so frequently used, so that not only the control circuit can be designed easily but also the control circuit can be constituted by a simple circuit compared with the case where control is carried out on one range which covers the whole thin-out rate of from 0 to 1. Further, because the reference voltage is changed by using one thin-out operation to thereby make it difficult to perform the next thin-out operation to prevent the continuous rest of switching pulses whenever thin-out operation is performed once in the case where the thin-out rate is in a range of from 0 to ½, stable control can be performed. Further, the ripple variation in the output of the switching power source can be reduced and at the same time the increase of the capacity of an electrolytic capacitor in an output stage can be prevented to attain reduction in cost.

Further, because the speed of resetting of the change of the reference voltage is changed in accordance with the output variation of the switching power source, thinned-out pulses can be distributed at proper intervals. Accordingly, it is possible to drive the switching element in an optimum manner to perform control more stably.

According to a second aspect of the present invention, the switching power source control circuit for controlling an output value of a switching power source to be a target value by thinning-out switching pulses, comprises a thin-out-processed pulse generation means for generating thin-out-processed pulses on the basis of a reference voltage, and a thin-out control means for performing control to change the reference voltage so as to make it difficult to perform next driving to prevent continuous driving of switching pulses when driving operation is performed once by the thin-out-processed pulse generation means with a driving rate in a range of from 0 to ½. Preferably, the thin-out control means controls the driving rate by changing the speed of resetting of the change of the reference voltage in accordance with the output variation of the switching power source.

In such a configuration, the reference voltage is changed by using one driving operation to thereby make it difficult to perform the next driving operation to prevent the continuous driving of switching pulses whenever driving operation is performed once in the case where the driving rate is in a range of from 0 to ½. Accordingly, stable control can be made. Further, because the speed of resetting of the change of the reference voltage is changed in accordance with the output variation of the switching power source, driving pulses can be distributed at proper intervals. Accordingly, it is possible to drive the switching element in an optimum manner to perform control more stably.

The dynamic range of the thin-out control means can be widened by increasing the width of change of the resetting speed of the changed reference voltage. Accordingly, stable controlling in this wide dynamic range can be made.

Further, by using the control circuits according to the first and second aspects of the invention in combination and at the same time by increasing the width of the change in the speed of resetting of the change of the reference voltage, it is possible to constitute a control circuit in which two control ranges overlap each other in a suitable manner around the thin-out rate of ½ so that thin-out control can be performed while shifting the control range between the tow control ranges. In such a configuration, the thin-out control is shifted so that the control ranges overlap each other in a suitable manner around the thin-out rate of ½. Accordingly, stable control can be made over that whole thin-out rate ranges of from 0 to ½.

In each of the above cases, the control circuit may be configured so that the switching power source includes a resonance circuit; and there is provided a circuit for detecting the zero-point of one of a resonance current of the converter, a switching current or a voltage applied to the switching element and for forcedly synchronizing the pulse rising and pulse falling of the reference clock oscillator on the basis of the thus detected signal. In this case, a phase shifter and a bias circuit may be provided for correcting the time lag of the detected signal so that the thus corrected signal is used as a forced synchronizing signal for the reference clock oscillator. Further, in order to change the zero-point passing angle of the resonance current/voltage gently, a saturable inductor may be series-connected to the resonance circuit.

When the zero point is detected to forcedly synchronize the pulse rising and pulse falling of the reference clock oscillator as described above, the variation in the resonance elements and the like and the time lag caused by the control circuit, the switching element and the like can be absorbed. Accordingly, the resonance type switching power source can be controlled stably. Further, when the detected signal is corrected and subjected to forced synchronization, the variation in the resonance elements and the like and the time lag caused by the control circuit, the switching element and the like can be absorbed more widely. Accordingly, the resonance type switching power source can be controlled more stably, so that the control circuit without the necessity of adjustment can be provided.

In addition, each of those control circuits can be constituted by a digital arithmetic operation circuit or, of course, can be constituted by an IC. When the control circuit is constituted by a digital circuit as described above, highly accurate control can be performed. When the control circuit is constituted by an IC, reduction in size can be realized.

BRIEF DESCRIPTION OF THE DRAWINGS

FIG. 2 is a waveform diagram showing a waveform in the case where the thin-out rate S in the control circuit depicted in FIG. 1 is in a range of from 0 to ½;

FIG. 3 is a waveform diagram showing a waveform in the case where the thin-out rate S in the control circuit depicted in FIG. 1 is in a range of from ½ to 1;

FIG. 12a and 12b are operation waveform diagrams of the switching power source depicted in FIG. 11;

FIG. 13 is a block diagram showing the case where the control circuit is constituted by a logic circuit;

FIGS. 15a–15c are waveform diagrams showing comparison in AC power control.

DESCRIPTION OF THE PREFERRED EMBODIMENTS

Figure 1:
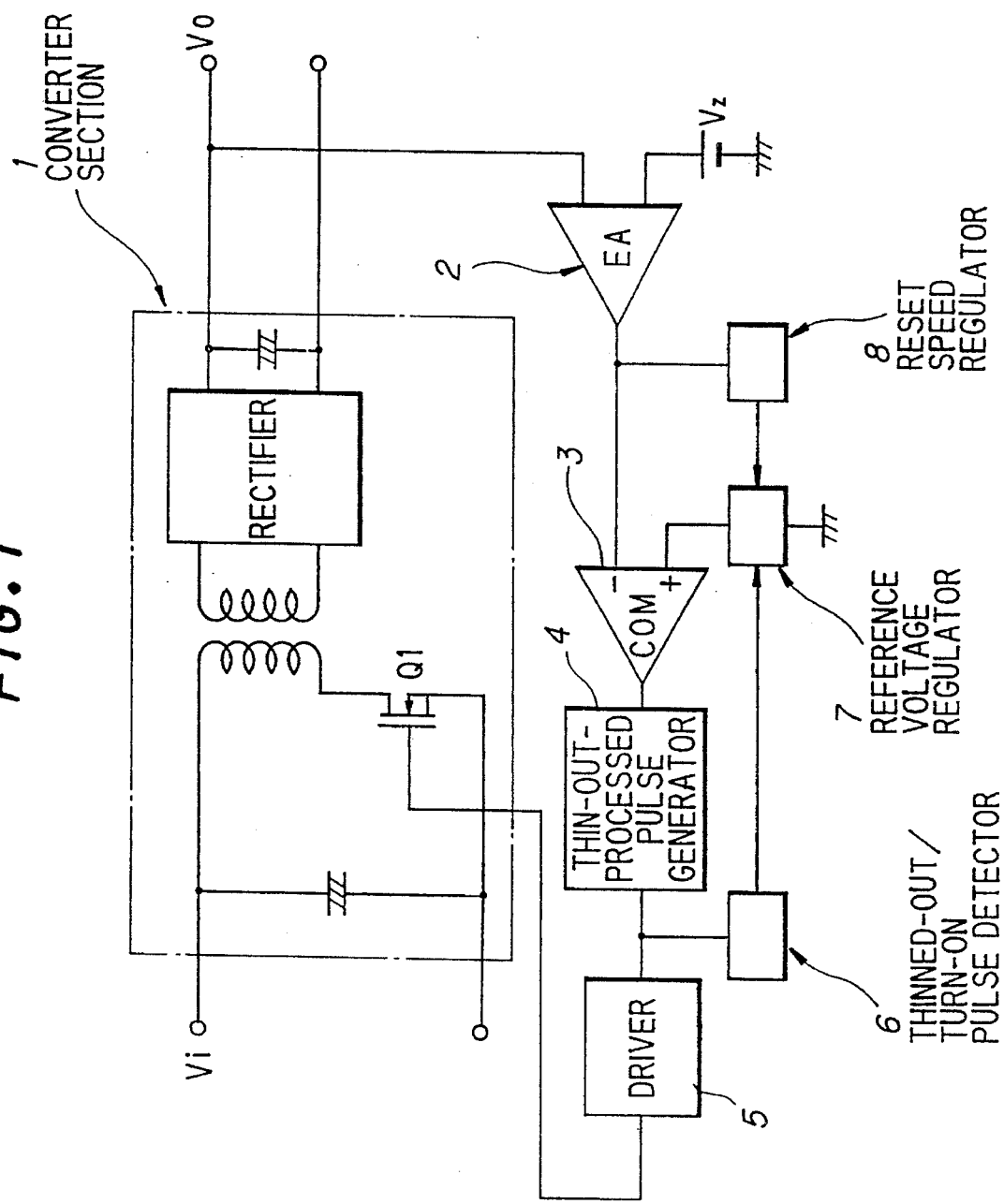
FIG. 1 is a block diagram showing an embodiment of a switching power source control circuit according to the present invention.

Embodiments of the present invention will be described below with reference to the drawings. FIG. 1 is a block diagram showing an embodiment of the switching power source control circuit according to the present invention; FIG. 2 is a waveform diagram showing a waveform in the case where the thin-out rate S in the control circuit depicted in FIG. 1 is in a range of from 0 to ½ when control is considered in view of the thin-out rate; FIG. 3 is a waveform diagram showing a waveform in the case where the thin-out rate S in the control circuit depicted in FIG. 1 is in a range of from ½ to 1 when control is considered in view of the driving rate; and FIG. 4 is a waveform diagram for explaining the thought of thinning-out and driving.

In FIG. 1, a DC-DC converter section 1 converts an input voltage Vi into an output voltage Vo on the basis of thin-out-processed pulses applied to a switching element Q1. The output voltage Vo of the converter section 1 is detected and amplified, with reference to a voltage Vz, by an error amplifier (EA) 2. Although FIG. 1 shows the case where a single element type converter circuit having one switching element Q1 is used as the converter section 1, any type converter circuit may be used. Similarly, any kind of error amplifier used in an ordinary switching power source may be used as the error amplifier 2.

A comparator (COM) 3 compares the output signal of the error amplifier 2 with a variable reference voltage generated by a reference voltage regulator 7 and generates a signal for thinning-out in accordance with the voltage difference between the output signal of the error amplifier 2 and the reference voltage from the reference voltage regulator 7. A thin-out-processed pulse generator 4 generates thin-out-processed pulses on the basis of the output signal of the comparator 3. The thin-out-processed pulse generator 4 may be constituted, for example, by a logical circuit formed by a combination of a clock oscillator and gate circuits. A driver 5 outputs driving pulses to drive the switching element Q1 on the basis of the thin-out-processed pluses generated by the thin-out-processed pulse generator 4.

A thinned-out/turn-on pulse detector 6 continuously monitors the thin-out-processed pulses from the thin-out-processed pulse generator 4 to thereby detect generation of thinned-out pulses or turned-on pulses which are driving pulses. The reference voltage regulator 7 changes the reference voltage applied to the comparator 3 on the basis of the signal detected by the detector 6. A reset speed regulator 8 resets the reference voltage of the reference voltage regulator 7 to an initial value in accordance with the output voltage of the error amplifier 2.

In a conventional switching power source, a PWM control method in which the width of pulses for driving the switching element Q1 is changed, a frequency control method in which the switching frequency of pulses for driving the switching element Q1 is changed, or the like, is used generally. In the present invention, on the other hand, control is performed by thin-out-processed pulses for driving the switching element Q1.

The operation theory of this thin-out control will be described below in detail. Assuming now that the total number of pulses outputted in a predetermined time, the number of pulses thinned out in the same predetermined time and the number of pulses which are left without being thinned out, that is, the driving pulses, in the same predetermined time, are represented by n, $m_{off}$ and $m_{on}$ respectively, then the following equation is obtained.

$$n = m_{off} + m_{on} \quad (1)$$

(in which n, $m_{off}$ and $m_{on}$ are positive integers respectively.)

When the pulse thin-out rate is represented by S, the pulse thin-out rate S in a relatively long time can be expressed on the basis of the aforementioned equation as follows.

$$S = \Sigma m_{off}/\Sigma n \quad (2)$$

When, conversely, the output rate of the number of driving pulses to the total number of pulses is represented by driving rate K, the driving rate K in a relatively long time can be expressed as follows.

$$K = \Sigma m_{on}/\Sigma n \quad (3)$$

According to the present invention, in the case where the thin-out rate S is required to be in a range of from 0 to ½ with the thin-out rate S=½ (that is, driving rate K=½ ) as a threshold, control is performed by repeating, as shown in FIG. 2, the thin-out rate S expressed by the following equation (2-a) which is obtained on the basis of the sum of denominators and the sum of numerators in fractions each having a numerator set to 1 in the equation (2).

$$\begin{aligned} S &= m_{off}/n \\ &= (1+1+\ldots+1)/\{(m_{on1}+1)+(m_{on2}+1)+ \\ &\quad \ldots + (m_{onk}+1)\} \end{aligned} \quad (2\text{-}a)$$

On the other hand, in the case where the thin-out rate S needs to be in a range of from ½ to 1 with the thin-out rate S=½ as a threshold, it is advantageous to express the control in terms of driving rate with K=½ as a threshold. In this case, therefore, control is performed by repeating, as shown in FIG. 3, the driving rate K expressed by the following equation (3-a) which is obtained on the basis of the sum of denominators and the sum of numerators in fractions each having a numerator set to 1 in the equation (3).

$$\begin{aligned} K &= m_{on}/n \\ &= (1+1+\ldots+1)/\{(m_{off1}+1)+(m_{off2}+1)+ \\ &\quad \ldots + (m_{offk}+1)\} \end{aligned} \quad (3\text{-}a)$$

Figure 4A:
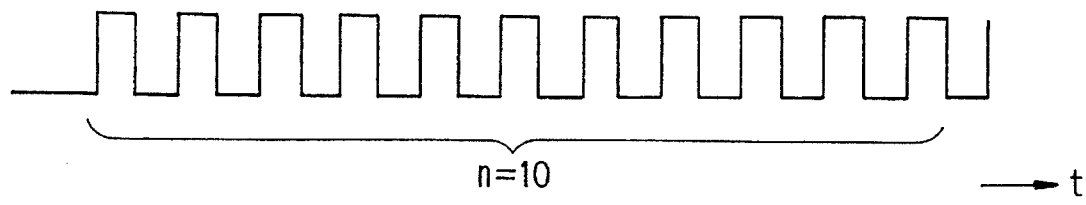
FIGS. 4a–4d are waveform diagrams and diagram for explaining the thought of thinning-out and driving.
Figure 4B:
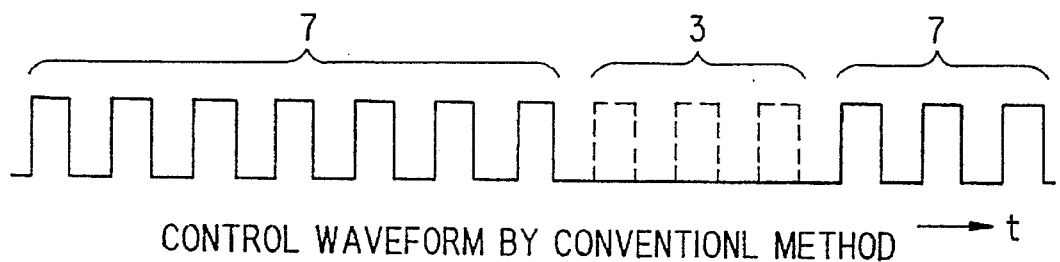

The case where an electric power transmission rate, that is, a driving rate K of 7/10 needs to be obtained will be described specifically. First, as shown in FIG. 4(b), in the case where the number of continuous driving pulses in a period of 10 (=n) pulses is 7, control becomes unstable. According to the present invention, therefore, control is performed so that the driving rate K expressed by the following equation (4) is repeated to distribute driving pulses smallest in the width of fluctuation in a low frequency region in accordance with the aforementioned operating theory.

$$\begin{aligned} K &= \{(3-1)+(3-1)+(4-1)\}/(3+3+4) \\ &= (2+2+3)/(3+3+4) \end{aligned} \quad (4)$$

Figure 4C:
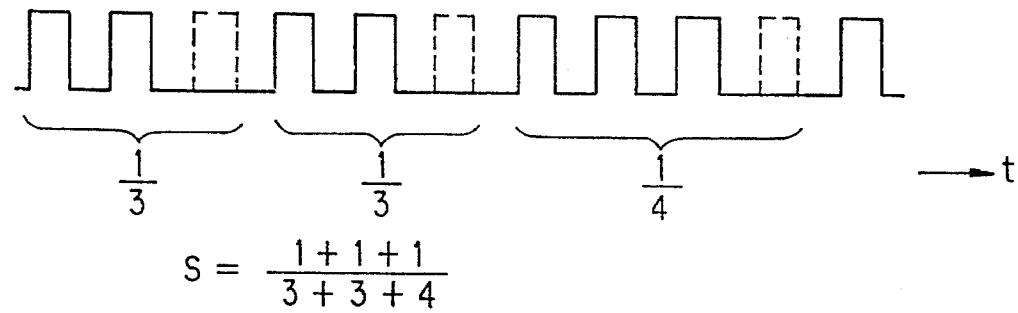

In the case where the thin-out rate S is in an ordinary range of from 0 to ½ the theory can be understood clearly and easily in terms of thin-out rate S rather than driving rate K. In order to obtain an electric power transmission rate of 7/10 in this case, 3 pulses per 10 pulses are thinned out as shown in FIG. 4(c), so that the following equation (5) is given from the equation (2-a).

$$S=(1+1+1)/(3+3+4) \quad (5)$$

Figure 4D:
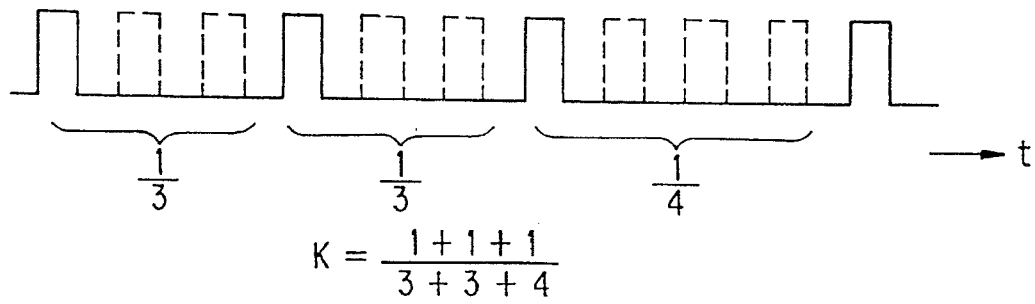

In the case where the thin-out rate S is in a range of from ½ to 1 (that is, driving rate K of from 0 to ½ ) larger than ½ for example, as shown in FIG. 4(d), the theory can be understood easily in terms of driving rate. In this case, therefore, the following equation (6) is given from the equation (3-a), similarly to the above case where the equation (5) is obtained.

$$K=(1+1+1)/(3+3+4) \quad (6)$$

Referring back to FIG. 1, in the case of the thin-out rate S in the range of from 0 to ½, not only the reference voltage of the reference voltage regulator 7 is changed in the direction to make it difficult to perform thinning-out to thereby prevent the continuance of thinning-out whenever the thinned-out pulse detector 6 detects one thinned-out pulse, but also the speed of resetting of the changed reference voltage to an initial value is changed, by the reset speed regulator 8, in accordance with the output voltage of the error amplifier 2, to adjust the time interval between a rest of pulse and the next rest to thereby carry out an operation so that the values $m_{onl}$ to $m_{onk}$ in the equation (2-a) become integers which are not different by 1 or more. If ideal pulse distribution can be obtained in the practical operation without the reset regulator 8, the reset regulator 8 is unnecessary.

The above description has been made on the case where the thin-out rate S is classified into a range of from 0 to ½ and a range of from ½ to 1 for simplification of control. In the case where control in the range of thin-out rate S from 0 to ½ is assumed, however, control can be made till the thin-out rate S reaches a certain value larger than ½ in accordance with the quantity of change in the reference voltage due to one thinning-out operation and the setting of the resetting range of the changed voltage. In order to perform wide dynamic range control, it is most preferable to perform control so that control in the case of the driving rate K smaller than ½ and control in the case of the thin-out rate S smaller than ½ overlap each other in the vicinity of ½.

Figure 5:
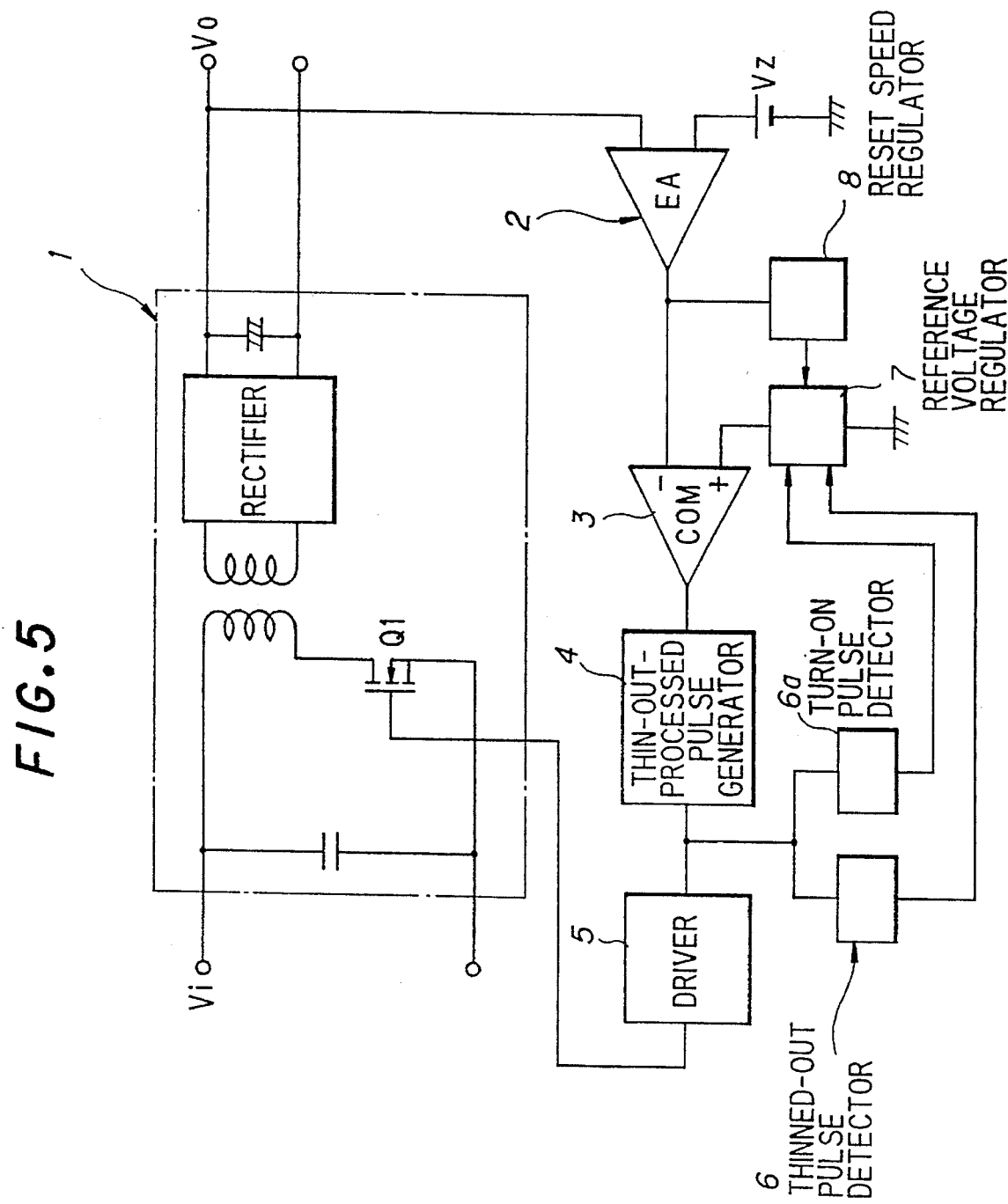
FIG. 5 is a block diagram showing an example of modification of the control circuit depicted in FIG. 1.

FIG. 5 shows a control circuit used in this case. In FIG. 5, parts identical with or equivalent to those in FIG. 1 are referenced correspondingly. In this control circuit, there are provided a thinned-out pulse detector 6 which operates when the thin-out rate S is in a range of from 0 to ½; and a turn-on pulse detector 6a which operates when the driving rate K is in a range of from 0 to ½. That is, this control circuit is formed so as to operate in the whole range of the thin-out rate S/driving rate K of from 0 to ½. The names given as "thinned-out pulse detector 6" and "turn-on pulse detector 6a" are for convenience sake.

Figure 6:
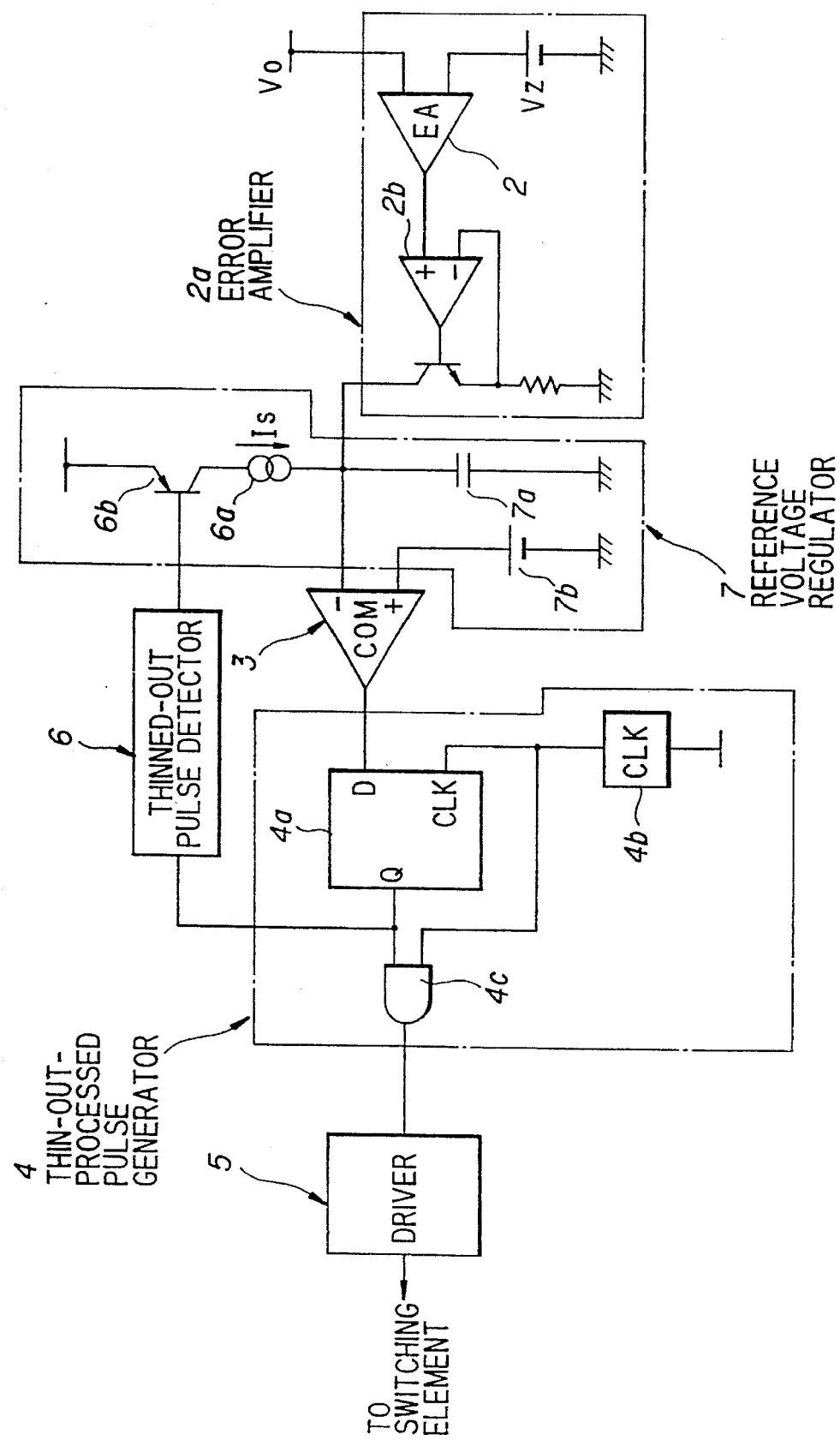
FIG. 6 is a circuit diagram showing a specific example of the control circuit depicted in FIG. 1.

FIG. 6 shows in detail a control circuit without providing the reset regulator 8 shown in FIGS. 1 and 5. A DC-DC converter 1 is not illustrated since it is identical with that shown in FIGS. 1 and 5. An error amplifier 2a is composed of an error amplifier 2 and a buffer circuit 2b. A comparator 3 which is identical in structure with that in FIGS. 1 and 5 compares the output voltage of the error amplifier 2a with a reference voltage generated by a reference voltage regulator 7 and generates a signal for performing thinning-out operation in accordance with a voltage difference between the output signal of the error amplifier 2a and the reference signal. A thin-out-processed pulse generator 4 is composed of a D flip-flop 4a, a reference clock oscillator (CLK) 4b, and an AND gate 4c. The thin-out-processed pulse generator 4 generates thin-out-processed pluses on the basis of the output signal of the comparator 3. A driver 5 which may be constituted by a general circuit and therefore it is not shown in detail.

A thinned-out pulse detector 6 is constituted by a constant current source (Is) 6a and a drive circuit 6b for driving the constant current source (Is) 6a. Any circuit may be used as the constant current source (Is) 6a as long as the circuit has a constant current source function. FIG. 6 shows the simplest example of the reference voltage regulator 7 which is constituted by a reference voltage source 7a and a capacitor 7b. Although the reference voltage regulator 7 in FIG. 6 is different from that in FIG. 1, this circuit 7 may be formed as shown in FIG. 6 in accordance with the polarity of the thinned-out pulse detector 6 and there is no theoretical difference between the two.

The operation of this control circuit will be described below. The comparator 3 compares the output of the error amplifier 2 with the reference voltage. When the output of the error amplifier 2 is higher than the reference voltage, an output for thinning-out operation is supplied from the comparator 3 to the thin-out-processed pulse generator 4. Thus, a thin-out-processed pluses are generated from the thin-out-processed pulse generator 4. The thinned-out pulse detector 6 detects the thinned-out pulse and supplies a current corresponding to the size of the thinned-out pulse to the reference voltage regulator 7 to thereby change the reference voltage in the direction to make it difficult to perform thinning-out.

By the aforementioned operation, proper thin-out-processed pulses as shown in the diagram (c) or (d) of FIG. 4 is outputted so that ideal control is performed. Although the turn-on pulse detector 6a as shown in FIG. 5 is not shown in FIG. 6, it may be constituted by the same circuit as the thinned-out pulse detector 6.

Figure 7:
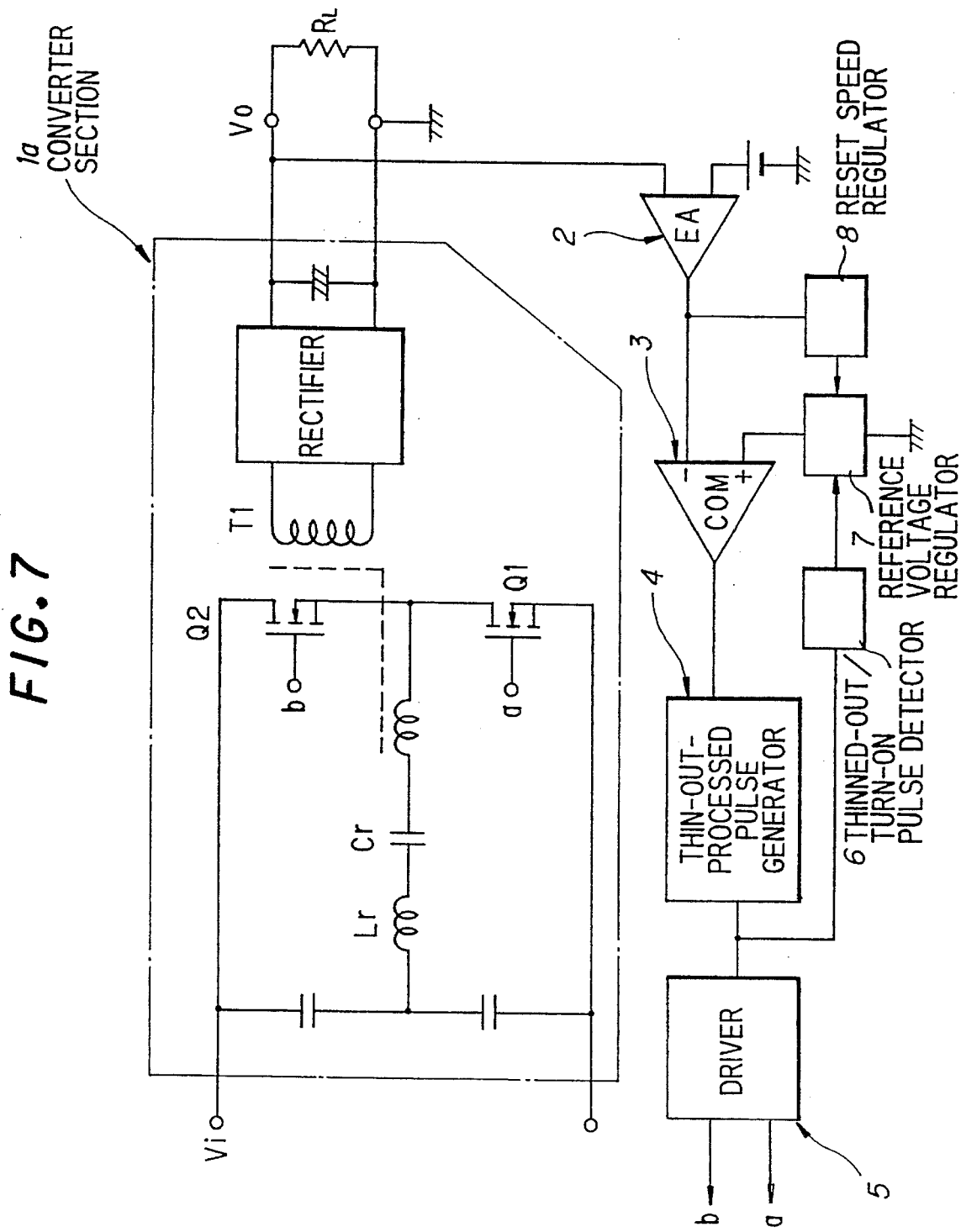
FIG. 7 is a block diagram showing the case where the control circuit depicted in FIG. 1 is applied to a primary series resonance converter.

FIG. 7 shows a circuit example in which the aforementioned control circuit is applied to a primary current resonance type converter. In FIG. 7, parts identical with or equivalent to those in FIG. 1 are referenced correspondingly. In FIG. 7, however, the converter section 1a is operated on the basis of two switching elements Q1 and Q2. Accordingly, the driver 5 requires two systems and it may be constituted by a two-output driver which is used generally.

Figure 8:
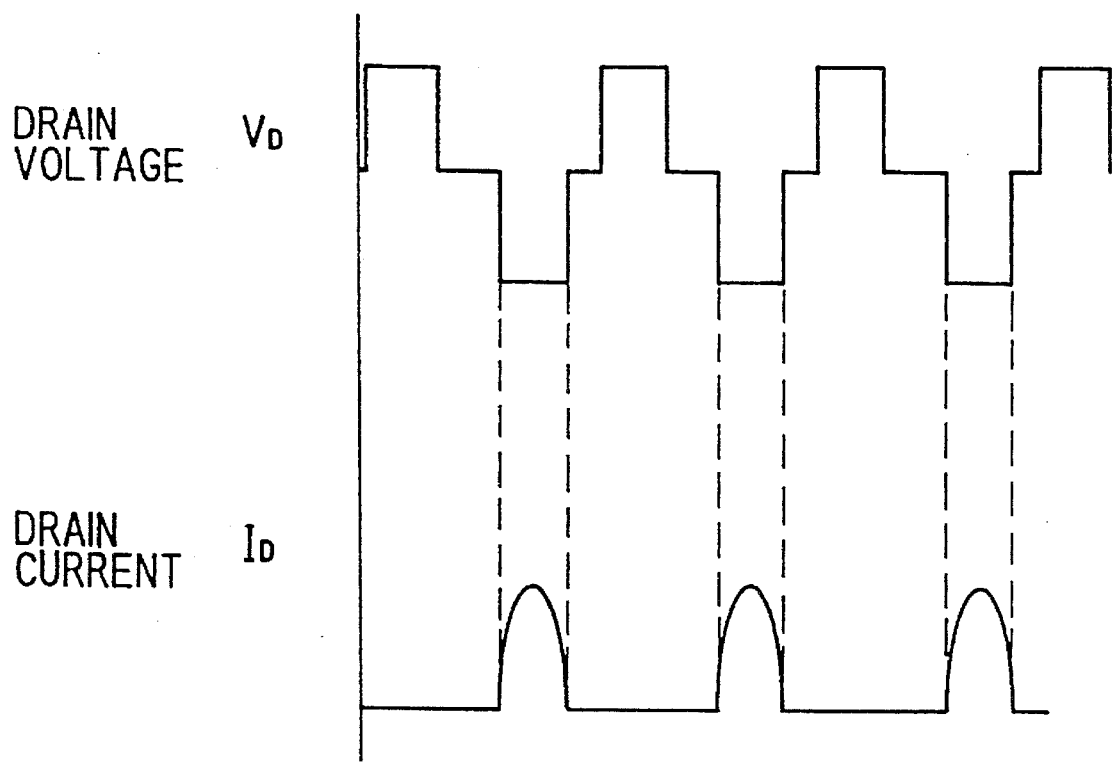
FIG. 8 is an operation waveform diagram of a series resonance converter.

As shown in FIG. 7, the converter section 1a is constituted by a series resonance type converter which is used generally. The converter section 1a operates so that the switching elements Q1 and Q2 turn on and off alternately. The switching current obtained in this case is a sinusoidal current determined on the basis of resonance elements Lr and Cr as shown in FIG. 8. Accordingly, the resulting switching loss is small compared with the case of a converter operated on the basis of a rectangular wave. Although it is general that control based on change of the switching frequency is performed in this type converter 1a, control based on thinning-out of pulses as described above is performed in this circuit.

Figure 9:
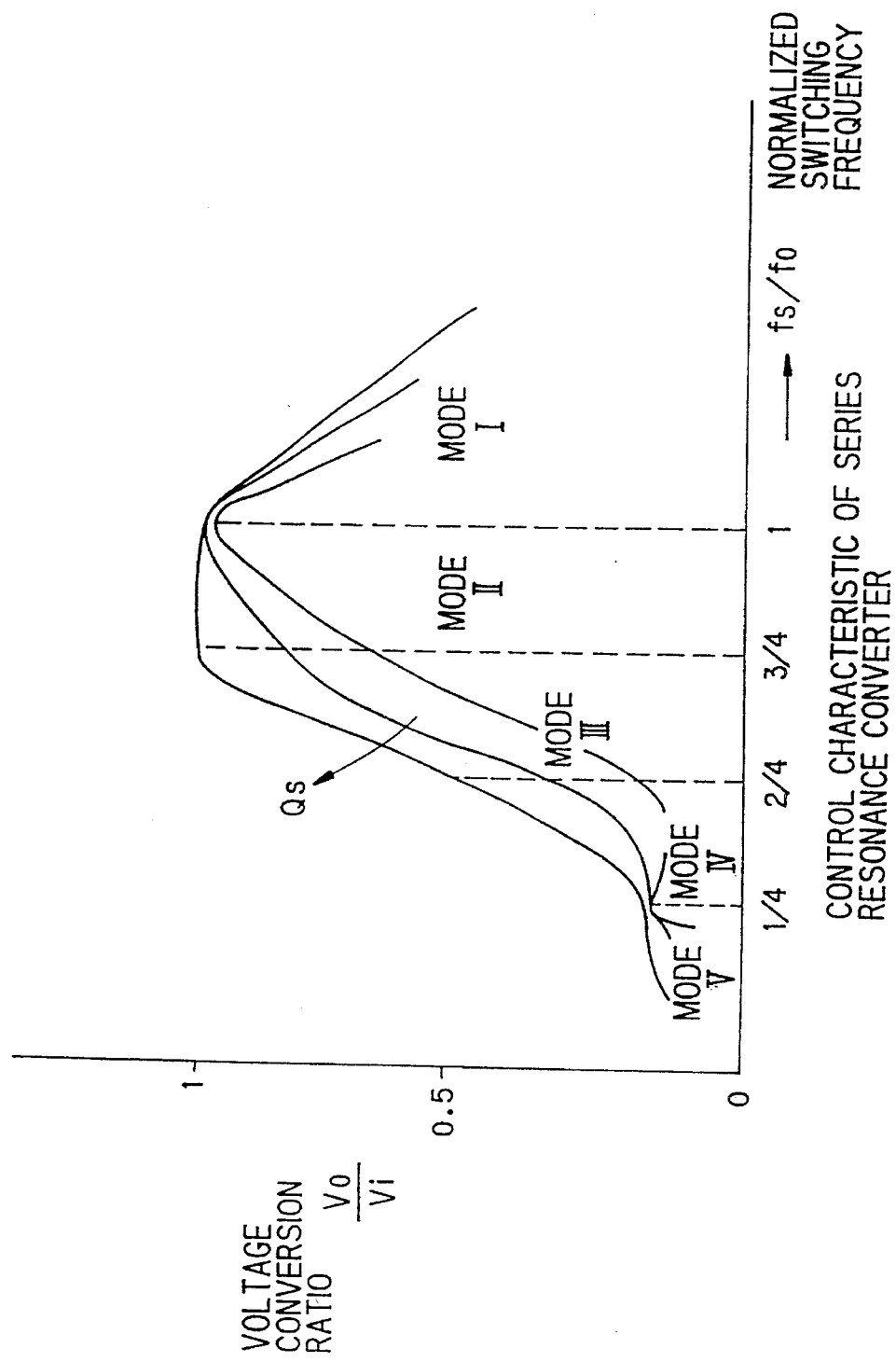
FIG. 9 is an explanatory graph showing control characteristic of the series resonance converter based on conventional frequency control.

FIG. 9 shows characteristic of a primary series resonance converter. In FIG. 9, fs represents the switching frequency, fo represents the resonance frequency of the resonance elements Lr and Cr, Vo represents the output voltage of the converter, Vi represents the input voltage of the converter, and Qs represents Q of the resonance circuit. The operating mode I is not used generally because the switching frequency fs is higher than the resonance frequency fo. In this type resonance converter, the driving waveform varies widely in accordance with the operating mode, so that the switching-on time is elongated as the number of modes increases.

According to the characteristic of the resonance converter, regions in which the frequency can be controlled are limited to regions in which the voltage is changed linearly by frequency conversion, that is, regions which are in operating modes II, III and IV and limited by the Qs range. As is obvious from FIG. 9, control cannot be performed in the mode II when Qs is large. Further, as the number of modes increases, the switching-off time is elongated so that control efficiency becomes poor.

When the resonance converter having the aforementioned characteristic is applied to thin-out control, not only control can be performed even in the case where Qs in the mode II is too large to control the frequency but also wide dynamic range control can be performed so that the switching-off time is not extremely elongated. Although most efficient control in the case of a resonance converter can be obtained by matching the switching frequency with the waveform determined on the basis of the resonance elements Lr and Cr, circuit adjustment is required to make circuit design difficult because of the variation in the resonance elements Lr and Cr, the switching elements Q1 and Q2 and the control circuit if such most efficient control is to be achieved.

According to the present invention, therefore, the variation in the resonance elements Lr and Cr and the switching elements Q1 and Q2 can be absorbed, so that a switching power source of good control efficiency without necessity of circuit adjustment can be provided. Further, as shown in FIG. 8, the turn-on rate of the switching elements Q1 and Q2 can be controlled to form not a narrow waveform but a waveform which can be used frequently to increase the duty ratio as greatly as possible. Accordingly, efficiency of the power source per se can be improved.

Figure 10:
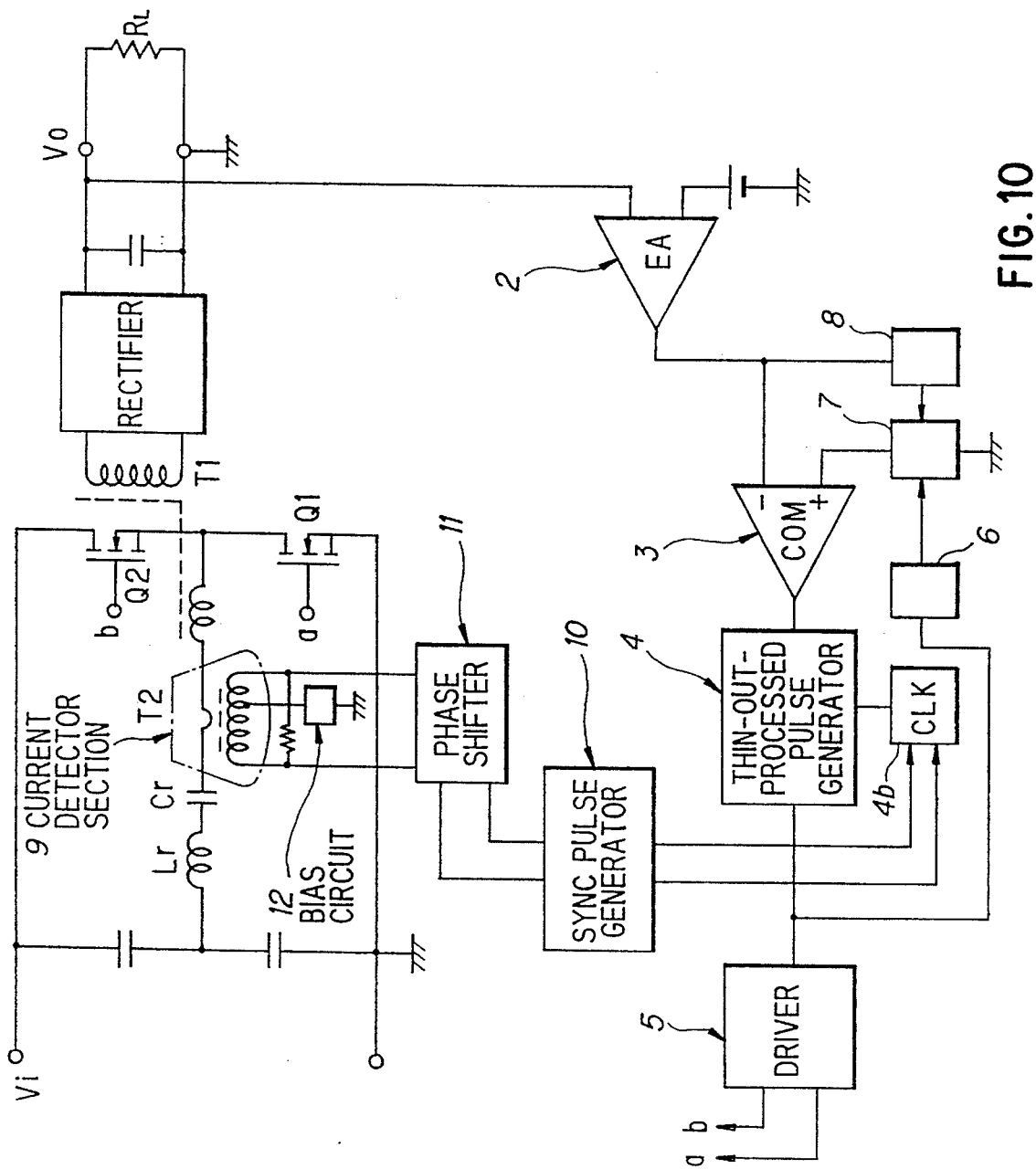
FIG. 10 is a block diagram showing an example of modification of the control circuit depicted in FIG. 7.

FIG. 10 shows a circuit which is formed by adding a current detector 9, a phase shifter 11, a synchronizing pulse generator 10 and a bias circuit 12 to the circuit of FIG. 7. A zero point is detected from one of the resonance current of the converter, the switching current and the voltages applied to the switching elements. On the basis of the thus detected signal, the pulse rising and pulse falling of the reference clock oscillator are forcedly synchronized. The time lag of the detected signal is corrected by the phase shifter and the bias circuit. The thus corrected signal is used as a forced synchronizing signal for the reference clock oscillator. In this embodiment, the current detector 9 is constituted by a current transformer for detecting the switching current. In the case where loss can be neglected, it is not always necessary that the current detector 9 is constituted by a current transformer. For example, in this case, the current detector 9 may be constituted by a resistor and the like. The synchronizing pulse generator 10 detects the zero point of the switching current and generates a synchronizing pulse to the clock oscillator 4b. The synchronizing pulse generator 10 may be constituted by a combination of a simple rectifier and a general gate circuit.

The phase shifter 11 adjusts the phase lag of the switching current detected by the current detector 9. Most simply, the phase shifter 11 may be constituted by a CR circuit. The bias circuit 12 gives a bias to the detected current to thereby remove the influence of the time lag caused by turn-on and turn-off of the switching elements Q1 and Q2. In the case where the time lag of the switching elements Q1 and Q2 and the other circuits is small enough to be neglected, the phase shifter 11 and the bias circuit 12 become unnecessary.

In the circuit shown in FIG. 10, the switching elements Q1 and Q2 are driven so as to be forcedly synchronized with a sinusoidal primary current waveform determined on the basis of the resonance elements Lr and Cr. Further, if necessary, the timing of the synchronizing signal waveform is adjusted by the phase shifter 11 and the bias circuit 12 to prevent the influence of the time lag of the switching elements Q1 and Q2 and the other circuits. As a result, a small-loss zero-cross switching operation is performed continuously.

Figure 11:
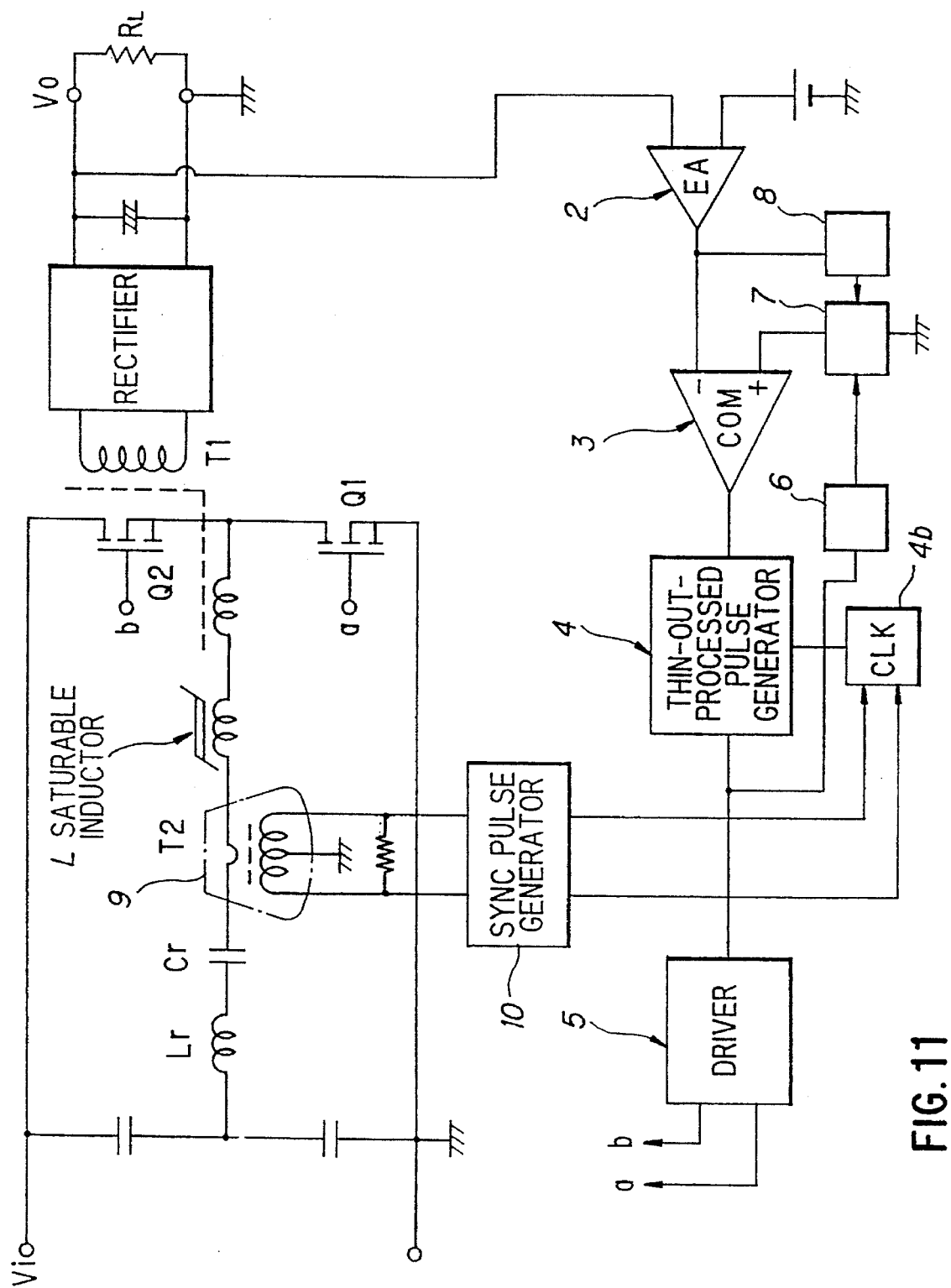
FIG. 11 is a block diagram showing another example of modification of the control circuit depicted in FIG. 7.

FIG. 11 shows another example of modification of the circuit depicted in FIG. 7. In FIG. 11, a current detector 9, a synchronizing pulse generator 10 and a saturable inductor L having a rectangular magnetization curve in which magnetization is saturated in a relatively low suitable value of flux density are added to the circuit of FIG. 7. Similarly to the circuit of FIG. 7, the circuit of FIG. 11 is a primary current resonance converter. By series-connecting the saturable inductor L to an arm supplied with a resonance current, the primary current resonance converter can be operated so that the current waveform changes gently at the zero-cross point as indicated by the arrow in FIG. 12(b). As a result, the phase shifter 11 and the bias circuit 12 shown in FIG. 9 may be omitted.

FIG. 13 shows the case where the aforementioned control circuit is constituted by a logic circuit. In FIG. 13, the section between the error amplifier 2 and the driver 5 is formed as a digital thin-out control section 15. In the thin-out control section 15, the output signal of the error amplifier 2 is converted into a digital signal by an A/D converter 16, so that a necessary thin-out-processed pulse pattern as shown in the diagram (c) or (d) of FIG. 4 is read from a memory (table) 17 in accordance with the digital signal. Then, the thin-out-processed pulse pattern is converted into a series pulse pattern by a shift register 18 and supplied to the driver 5. These circuits 16 to 18 are controlled by a control circuit 19. The control circuit 19 may be constituted by a clock circuit and simple gate circuits such as a circuit for reading data from the memory 17, a timing circuit, and so on.

Figure 14:
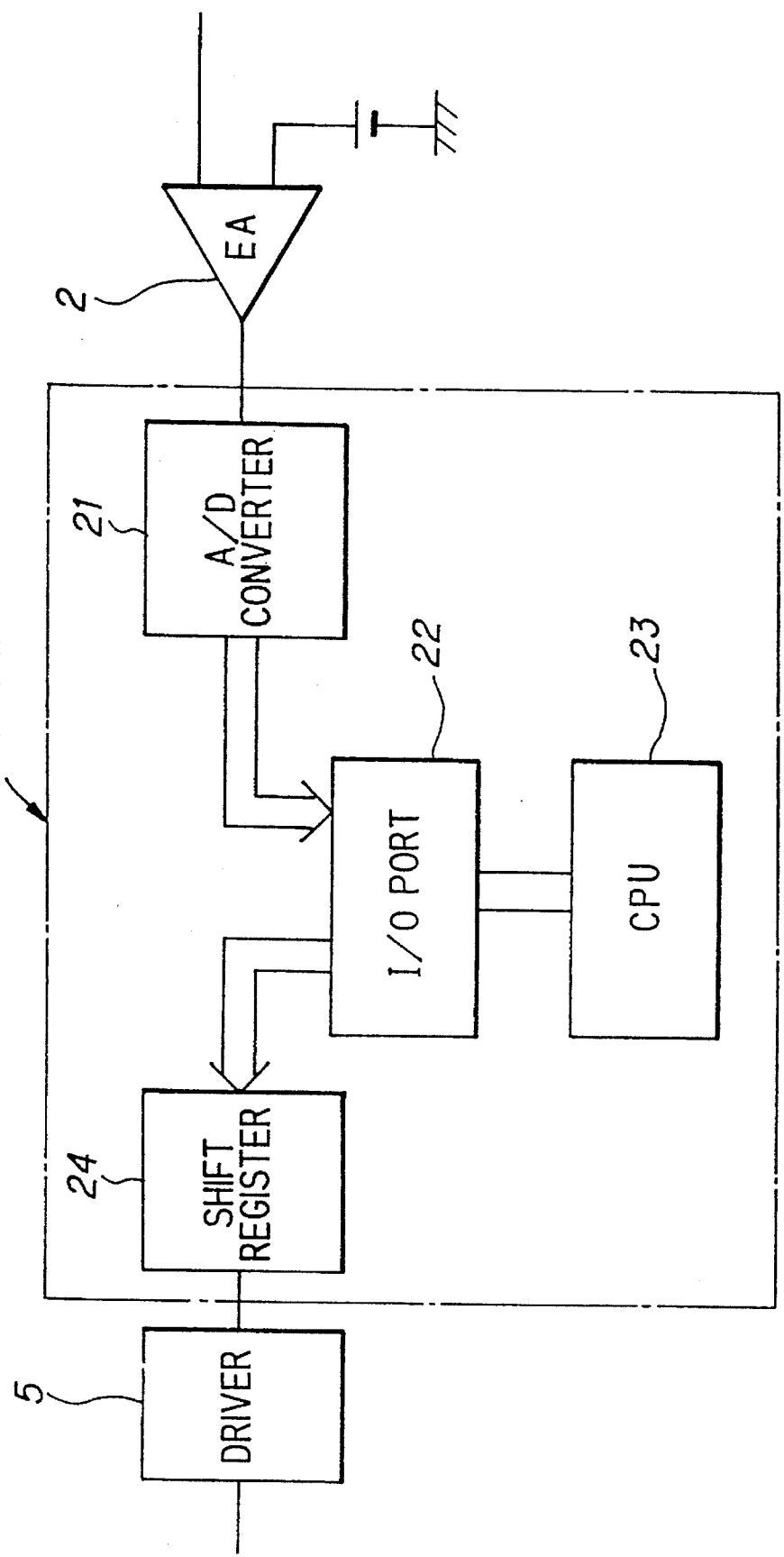
FIG. 14 is a block diagram showing the case where the control circuit is constituted by a micro-computer.

FIG. 14 shows another example of the logic circuit in which a thin-out control section 20 is constituted by a micro-computer. The A/D converter 21 and the shift register 24 are the same as those shown in FIG. 13, except that the signal subjected to conversion by the A/D converter 21 is fetched into a CPU 23 through an I/O port 22 so that thin-out-processed pulses are outputted through the shift register 24 after a necessary arithmetic operation in the CPU 23. The necessary arithmetic operation in the CPU 23 is carried out on the basis of a program to perform the aforementioned thin-out operation.

What is claimed is:

1. A switching power source control circuit comprising:

a voltage conversion means for converting an input voltage of said switching power source on the basis of thin-out-processed pulses obtained by thinning-out continuous switching pulses to be supplied to a switching element and for outputting the thus converted voltage;

an error detection means for detecting an error of the output voltage of said voltage conversion means from a target value which is set in advance so that the switching pulses are thinned out so as to control an output value of said switching power source to be said target value;

a reference voltage regulation means for generating a variable reference voltage for performing thin-out operation;

a comparison means for comparing an output voltage of said error detection means with the reference voltage outputted from said reference voltage regulation means to thereby generate an output signal for performing the switching pulse thin-out operation in accordance with a voltage difference between the output voltage of said error detection means and the reference voltage of said reference voltage regulation means;

a thin-out-processed pulse generation means for generating said thin-out-processed pulses on the basis of the output signal of said comparison means;

a control means for performing control to change said reference voltage supplied from said reference voltage regulation means to said comparison means so as to make it difficult to perform next thin-out operation to prevent continuous rest of switching pulses when thin-out operation is performed once by said thin-outprocessed pulse generation means with a thin-out rate in a range of from 0 to ½;

a driving means for outputting driving pulses for driving said switching element on the basis of the thin-out-processed pulses generated from said thin-out-processed pulse generation means; and a reset speed regulation means for changing the speed of resetting of the reference voltage regulated by said reference voltage regulation means in accordance with a change in output of said error detection means.

2. A switching power source control circuit comprising:

a voltage conversion means for converting an input voltage of said switching power source on the basis of thin-out-processed pulses obtained by thinning-out continuous switching pulses to be supplied to a switching element and for outputting the thus converted voltage;

an error detection means for detecting an error of the output voltage of said voltage conversion means from a target value which is set in advance so that the switching pulses are thinned out so as to control an output value of said switching power source to be said target value;

a reference voltage regulation means for generating a variable reference voltage for performing thin-out operation;

a comparison means for comparing an output voltage of said error detection means with the reference voltage outputted from said reference voltage regulation means to thereby generate an output signal for performing thin-out operation on switching pulses in accordance with a voltage difference between the output voltage of said error detection means and the reference voltage of said reference voltage regulation means;

a thin-out-processed pulse generation means for generating said thin-out-processed pulses on the basis of the output signal of said comparison means;

a control means for performing control to change said reference voltage supplied from said reference voltage regulation means to said comparison means so as to make it difficult to perform next thin-out operation to prevent continuous rest of switching pulses when driving is performed once by said thin-out-processed pulse generation means with a driving rate in a range of from 0 to ½;

a driving means for outputting driving pulses for driving said switching element on the basis of the thin-out-processed pulses generated from said thin-out-processed pulse generation means; and a reset speed regulation means for changing the speed of resetting of the reference voltage regulated by said reference voltage regulation means in accordance with a change in output of said error detection means.

3. A switching power source control circuit, comprising:

a voltage conversion means for converting an input voltage of said switching power source on the basis of thin-out-processed pulses obtained by thinning-out continuous switching pulses to be supplied to a switching element and for outputting the thus converted voltage;

an error detection means for detecting an error of the output voltage of said voltage conversion means from a target value which is set in advance so that the switching pulses are thinned out so as to control an output value of said switching power source to be said target value;

a reference voltage regulation means for generating a variable reference voltage for performing thin-out operation;

a comparison means for comparing an output signal of said error detection means with the reference voltage outputted from said reference voltage regulation means to thereby generate an output signal for performing thin-out operation in accordance with a voltage difference between the output voltage of said error detection means and the reference voltage of said reference voltage regulation means;

a thin-out-processed pulse generation means for generating said thin-out-processed pulses on the basis of the output signal of said comparison means;

a first control means for performing control to change said reference voltage supplied from said reference voltage regulation means to said comparison means so as to make it difficult to perform next thin-out operation to prevent continuous rest of switching pulses when thin-out operation is performed once by said thin-out-processed pulse generation means with a thin-out rate in a range of from 0 to ½ and a second control means for performing control to change said reference voltage supplied from said reference voltage regulation means to said comparison means so as to make it difficult to perform next thin-out operation to prevent continuous rest of switching pulses when driving is performed once by said thin-out-processed pulse generation means with a driving rate in a range of from 0 to ½;

a driving means for outputting driving pulses for driving said switching element on the basis of the thin-out-processed pulses generated from said thin-out-processed pulse generation means; and a reset speed regulation means for changing the speed of resetting of the reference voltage regulated by said reference voltage regulation means in accordance with a change in output of said error detection means;

whereby the thin-out is performed with a thin-out rate in a range of from 0 to 1.

4. A switching power source control circuit according to claim 1 wherein said voltage conversion means includes a resonance circuit, and wherein said switching power source control circuit further comprises a circuit for detecting a zero point of one of a resonant current of said resonance circuit, a switching current and a voltage applied to said switching element and for forcedly synchronizing pulse rising and pulse falling of a reference clock oscillator on the basis of the thus detected signal.

5. A switching power source control circuit according to claim 1 wherein said voltage conversion means includes a resonance circuit, and wherein said switching power source control circuit further comprises a circuit for detecting a zero point of one of a resonant current of said resonance circuit, a switching current and a voltage applied to said the switching element and for forcedly synchronizing pulse rising and pulse falling of a reference clock oscillator on the basis of the thus detected signal, and a phase shift circuit and a bias circuit for correcting time lag of said detected signal, the signal thus corrected by these circuits being used as a forced synchronizing signal for said reference clock oscillator.

6. A switching power source control circuit according to claim 1 wherein said voltage conversion means includes a resonance circuit, and wherein said switching power source control circuit further comprises a circuit for detecting a zero point of one of a resonant current of said resonance circuit, a switching current and a voltage applied to said the switching element and for forcedly synchronizing pulse rising and pulse falling of a reference clock oscillator on the basis of the thus detected signal, and a phase shift circuit and a bias circuit for correcting time lag of said detected signal, and wherein a saturable inductor is series-connected to said resonance circuit in order to change a zero-point passing angle of the resonance current or voltage gently.

7. A switching power source control circuit according to claim 2, wherein said voltage conversion means includes a resonance circuit, and wherein said switching power source control circuit further comprises a circuit for detecting a zero point of one of a resonant current of said resonance circuit, a switching current and a voltage applied to said switching element and for forcedly synchronizing pulse rising and pulse falling of a reference clock oscillator on the basis of the thus detected signal.

8. A switching power source control circuit according to claim 3, wherein said voltage conversion means includes a resonance circuit, and wherein said switching power source control circuit further comprises a circuit for detecting a zero point of one of a resonant current of said resonance circuit, a switching current and a voltage applied to said switching element and for forcedly synchronizing pulse rising and pulse falling of a reference clock oscillator on the basis of the thus detected signal.

9. A switching power source control circuit according to claim 2, wherein said voltage conversion means includes a resonance circuit, and wherein said switching power source control circuit further comprises a circuit for detecting a zero point of one of a resonant current of said resonance circuit, a switching current and a voltage applied to said switching element and for forcedly synchronizing pulse rising and pulse falling of a reference clock oscillator on the basis of the thus detected signal, and a phase shift circuit and a bias circuit for correcting time lag of said detected signal, the signal thus corrected by these circuits being used as a forced synchronizing signal for said reference clock oscillator.

10. A switching power source control circuit according to claim 3, wherein said voltage conversion means includes a resonance circuit, and wherein said switching power source control circuit further comprises a circuit for detecting a zero point of one of a resonant current of said resonance circuit, a switching current and a voltage applied to said switching element and for forcedly synchronizing pulse rising and pulse falling of a reference clock oscillator on the basis of the thus detected signal, and a phase shift circuit and a bias circuit for correcting time lag of said detected signal, the signal thus corrected by these circuits being used as a forced synchronizing signal for said reference clock oscillator.

11. A switching power source control circuit according to claim 2, wherein said voltage conversion means includes a resonance circuit, and wherein said switching power source control circuit further comprises a circuit for detecting a zero point of one of a resonant current of said resonance circuit, a switching current and a voltage applied to said switching element and for forcedly synchronizing pulse rising and pulse falling of a reference clock oscillator on the basis of the thus detected signal, and a phase shift circuit and a bias circuit for correcting time lag of said detected signal, and wherein a saturable inductor is series-connected to said resonance circuit in order to change a zero-point passing angle of the resonance current or voltage gently.

12. A switching power source control circuit according to claim 3, wherein said voltage conversion means includes a resonance circuit, and wherein said switching power source control circuit further comprises a circuit for detecting a zero point of one of a resonant current of said resonance circuit, a switching current and a voltage applied to said switching element and for forcedly synchronizing pulse rising and pulse falling of a reference clock oscillator on the basis of the thus detected signal, and a phase shift circuit and a bias circuit for correcting time lag of said detected signal, and wherein a saturable inductor is series-connected to said resonance circuit in order to change a zero-point passing angle of the resonance current or voltage gently.

* * * * *